(12) United States Patent
Vieira et al.

(10) Patent No.: US 9,085,376 B2
(45) Date of Patent: Jul. 21, 2015

(54) MODULATOR OF FORCES APPARATUS COMPRISING SUBMERGED MAGNETIC BIOSPHERE AND METHOD OF STABILIZING MATTER

(75) Inventors: Joao Ernandes Silveira Vieira, Porto Alegre (BR); Paulo Roberto G. Franco, Porto Alegre (BR)

(73) Assignee: União Brasileira de Educação e Assistência—Mantenedora da PUC RS, Porto Alegre (BR)

( * ) Notice: Subject to any disclaimer, the term of this patent is extended or adjusted under 35 U.S.C. 154(b) by 460 days.

(21) Appl. No.: 13/511,595

(22) PCT Filed: Nov. 30, 2010

(86) PCT No.: PCT/BR2010/000396
§ 371 (c)(1),
(2), (4) Date: Aug. 8, 2012

(87) PCT Pub. No.: WO2011/063483
PCT Pub. Date: Jun. 3, 2011

(65) Prior Publication Data
US 2012/0295241 A1    Nov. 22, 2012

(30) Foreign Application Priority Data
Nov. 30, 2009 (BR) ..................... 0904555

(51) Int. Cl.
*B64G 7/00* (2006.01)
*G09B 23/06* (2006.01)
*G09B 23/12* (2006.01)

(52) U.S. Cl.
CPC *B64G 7/00* (2013.01); *G09B 23/06* (2013.01); *G09B 23/12* (2013.01)

(58) Field of Classification Search
USPC ........................................ 73/865.6
See application file for complete search history.

(56) References Cited

U.S. PATENT DOCUMENTS

| 6,596,076 B1 | 7/2003 | Wakayama |
| 2004/0016393 A1 | 1/2004 | Carter |
| 2004/0267104 A1* | 12/2004 | Hannula et al. ............ 600/340 |
| 2006/0019388 A1* | 1/2006 | Hutmacher et al. ......... 435/394 |
| 2009/0081752 A1* | 3/2009 | Dennis et al. ............. 435/173.8 |
| 2009/0105997 A1 | 4/2009 | Nagasaka |

FOREIGN PATENT DOCUMENTS

| BR | PI8200788-8 | 10/1983 |
| EP | 1770717 A1 | 4/2007 |
| WO | 2004064221 A2 | 7/2004 |

* cited by examiner

*Primary Examiner* — Paul West
(74) *Attorney, Agent, or Firm* — Laurence P. Colton; Smith Risley Tempel Santos LLC

(57) ABSTRACT

A force modulating apparatus for minimizing and/or blocking forces such as the Coriolis force, gravitational, and centrifugal force, simulating the environment of the cosmos. A stabilizing method for material with respect to light and the structure of atoms.

17 Claims, 11 Drawing Sheets

MODULATOR OF FORCES APPARATUS COMPRISING SUBMERGED MAGNETIC BIOSPHERE AND METHOD OF STABILIZING MATTER

STATEMENT OF RELATED APPLICATIONS

This patent application claims the benefit of and is the US PCT National Phase under 35 USC 371 of International Application No. PCT/BR2010/000396 having an International Filing Date of 30 Nov. 2010, which claims priority on Brazilian patent application no. PI 0904555-4 having a filing date of 30 Nov. 2009.

BACKGROUND OF THE INVENTION

1. Field of the Invention

This invention describes a force modulating apparatus which causes a 3D sphere to rotate (Bio Sphere) and a magnetic reactor (magnetic core) built into the system. More specifically, this invention comprises a minimizing apparatus and/or a blocker of forces such as the Coriolis, gravitational and centrifugal forces, simulating the environment of the cosmos. Additionally, this invention describes a method to stabilize matter, particularly with respect to light and the structure of atoms. This invention falls within the fields of engineering and physics.

2. Prior Art

Gravitational force is a force of mutual attraction that material bodies exercise upon each other. From a practical point of view, the gravitational attraction of the Earth confers weight to objects and causes them to fall to the ground when they are released into the air (as the attraction is mutual, the Earth also moves towards the objects, but only by a tiny fraction). Furthermore, gravity is the reason why the Earth, the sun and other celestial bodies are: without it matter would not be able to clump to form those bodies and life as we know it would not have emerged. However research shows that in some situations the absence of gravity is beneficial as it minimizes and/or cancels out the action of this force, such as for example the development of a seed, which would not have to struggle against the force of gravity in order to grow. So more and more scientists have sought to create situations in which they can work with zero-gravity environments, such as that found in space. Some experiments have already been tested in micro-laboratories of the International Space Station (ISS).

The patent literature search revealed some relevant documents that will be described below.

US Patent Publication No. 2009/0105997 reveals a dynamic simulation device for simulating physical interactions on various objects in a given environment, simulating even contact and collision between the objects in order to describe the relationships between the forces and accelerations, helping to solve motion equations, as linear equations. This invention differs from that document in that it comprises an apparatus and a system able to cancel out and/or minimize forces such as the Coriolis, gravitational, and centrifugal forces, simulating the environment of the cosmos, which is a fact not mentioned in said document.

US Patent Publication No. 2004/0016393 discloses an apparatus to simulate a microgravitational environment comprising a cylinder capable of containing at least one microgravitational environment, and a means for sealing the top and bottom of said cylinder. In particular, the cylinder may comprise a steam diffuser, and a means for temperature control, allowing its use for crystal growth. This invention differs from that document in that it comprises an apparatus and a system made of a glass globe which is able to cancel out and/or minimize forces such as the Coriolis, gravitational, and centrifugal forces, simulating the environment of the cosmos, which is a fact not mentioned in said document.

Brazilian Patent No. PI 8200788-8 discloses a process comprising the use of three electromagnets within a device, placed perpendicularly to each other and which are work magnetically suspended by an upper electromagnet and another lower one of the same signal. By rotating one of the magnets, it is possible to reduce or override gravity. This invention differs from that document in that it comprises an apparatus and a system made of a glass globe capable of canceling out and/or minimize forces such as the Coriolis, gravitational, and centrifugal forces, simulating the environment of the cosmos, which is a fact not mentioned in said document.

European Patent No. EP 1,770,717 discloses a reactor for creating gaseous matter through certain conditions of centrifugal and vacuum force, in the presence of ionizing conditions and containing a central rotatable magnetic field that is able to create diverse plasma conditions. This invention differs from that document in that it's not intended for the creation of gaseous matter, but rather a simulation of an environment such as that found in the cosmos.

U.S. Pat. No. 6,596,076 discloses an apparatus to simulate an altered gravitational environment in a particular region, comprising a container and a magnetic system arranged around this container to induce a magnetic field gradient, simulating an altered gravitational field without conducting electricity therein. This invention differs from that document in that it comprises an apparatus and a system made of a glass globe which is able to cancel out and/or minimize forces such as the Coriolis and centrifugal forces, as well as the gravitational, which is a fact not mentioned in said document.

International Patent Publication No. WO 04/064221 discloses a system and method of generating power in function of the gravitational force, including potential energy, including positioning a fluid with a major mass state at a significant elevation and a fluid in the vapor state in order to alter the fluid and provide thermal energy. This invention differs from the document mentioned in that it comprises an apparatus and a system made of a glass globe which is able to cancel out and/or minimize forces such as gravitational, Coriolis and centrifugal, as well as the gravitational, which is a fact not mentioned in said document.

What is clear from the literature researched is that no prior documents were found suggesting the disclosures of this invention, so that the solution proposed herein is novel and has an inventive step in comparison with the prior art.

BRIEF SUMMARY OF THE INVENTION

In a first aspect, this invention provides for an apparatus capable of simulating a cosmic environment, modulating and/or canceling out forces, such as Coriolis, gravitational, and centrifugal forces.

An object of this invention is a force modulating apparatus comprising:
a) Means for rotating, support and mounting;
b) A glass globe;
c) Means for immersion;
d) Magnetic reactor; and
e) Means for grounding.

In a second aspect, this invention provides for a method to stabilize matter where its stabilization is achieved through modulation of forces, such as Coriolis, gravitational, and centrifugal forces.

Therefore, a further object of this invention is a stabilization method for matter comprising the following stages:
a) Insertion of the material to be stabilized into the glass globe;
b) Positioning the glass globe into the means for rotating, support and mounting;
c) Immersion of the means for rotating, support and mounting with the glass globe in the means for immersion; and
d) Movement of the glass globe in order to block the forces.

These and other objects of the invention shall be immediately appraised by those well versed in the art and by companies with interests in the sector, and will be described in detail sufficient for its reproduction, in the following description.

BRIEF DESCRIPTION OF THE FIGURES

FIG. 1 shows the force modulating apparatus wherein:

Part 1 is a mounting base for the 3 dimensional (3D) mobile system.

Part 2 is a telescoping tube to adjust the depth of submersion of the assembly.

Part 3 is a turbine for longitudinal rotation with a sliding central axis in part 5 in the system.

Part 4 is a ring (crown) with the function of supporting the glass globe through two sliding pivot bearings (longitudinal rotation) and for centrally mounting the inlet funnel for the flow of liquid from turbine 6, that is responsible for the rotation of the globe on the orthogonal plane.

Part 5 is a bearing system for mounting the axis of the rotor.

Part 6 is the transverse rotational turbine section through the pivots 10.

Part 7 is a mounting bracket for the silicone hoses with the function of injecting liquid under pressure to obtain transverse rotation of the globe in conjunction with orthogonal rotation providing three dimensional movement of the globe.

Part 10 is constituted by pivots with tapered rollers for rotating to regulate and make adjustments in the stepped pressure.

Figure 1:
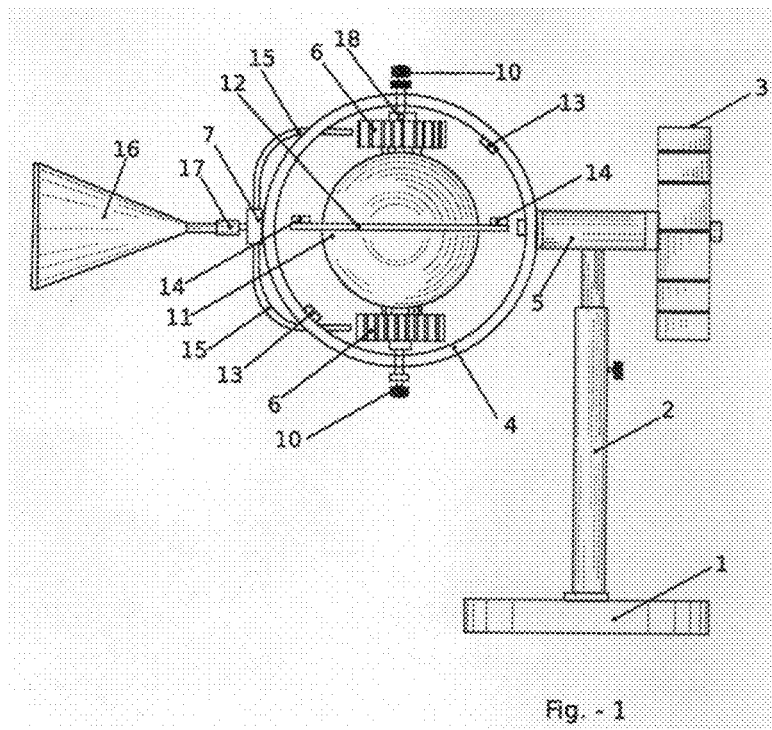

Part 11 is a glass globe which, depending upon the experiment, may have any radius, in other words, it may be of a large size for use in marine activities, to improve marine ecosystems. The size of the globe shown in FIG. 1 is 380 ml.

Part 12 is an orbital ring mounted on the globe with the magnetic cores which form the reactor's magnetic fields in the system on the transverse axis.

Part 13 is made up of magnetic cores (rare earth) mounted to the orbital ring which form the reactor's magnetic fields in the system on the longitudinal axis.

Part 14 is made up of magnetic cores (rare earth) mounted to the orbital ring which form the reactor's magnetic fields in the system on the transverse axis.

Part 15 is made up of tubes for injecting fluids under pressure to drive the transverse turbine.

Piece 16 is a cone-shaped input funnel for the flow of liquid to drive the transverse turbines.

Part 17 is a vibration absorption connector to prevent the system from going into resonance unbalancing the system.

Part 18 is a valve for the application of oxygen during tests with living species.

Figure 2:
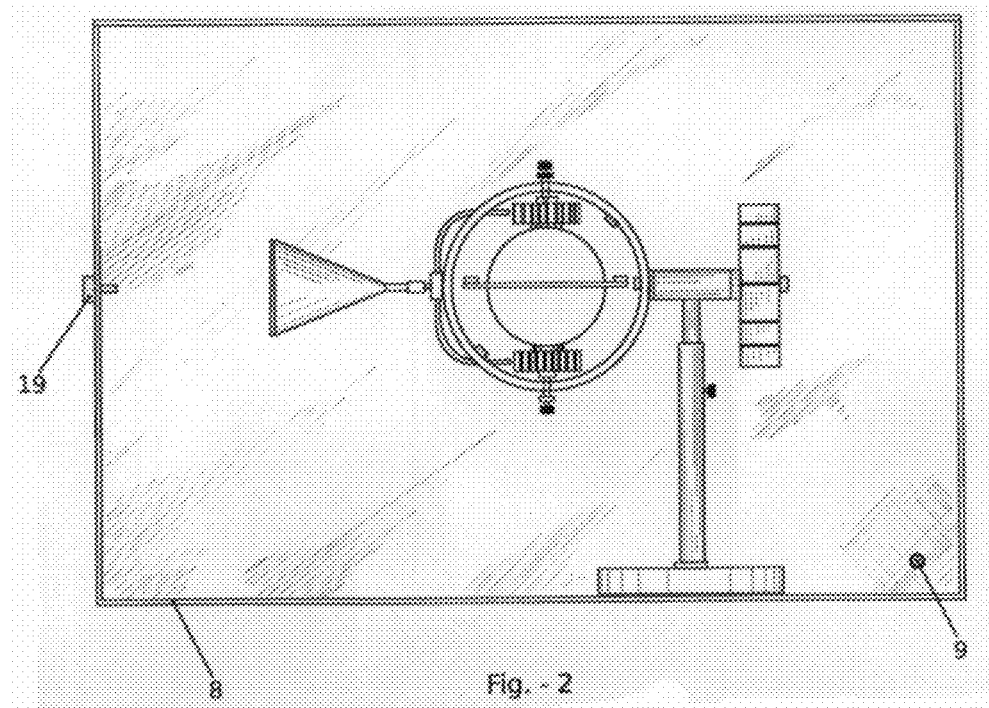

FIG. 2 shows an apparatus submerged in an aquarium tank wherein:

Part 8 is a container-shaped aquarium to submerge the system.

Part 9 is a metal mesh which functions to ground the system thus preventing external electromagnetic interference, as well as static electricity fields in the environment.

Part 19 is a valve for injecting liquid under pressure which functions by activating the transverse and longitudinal turbines.

Figure 3:
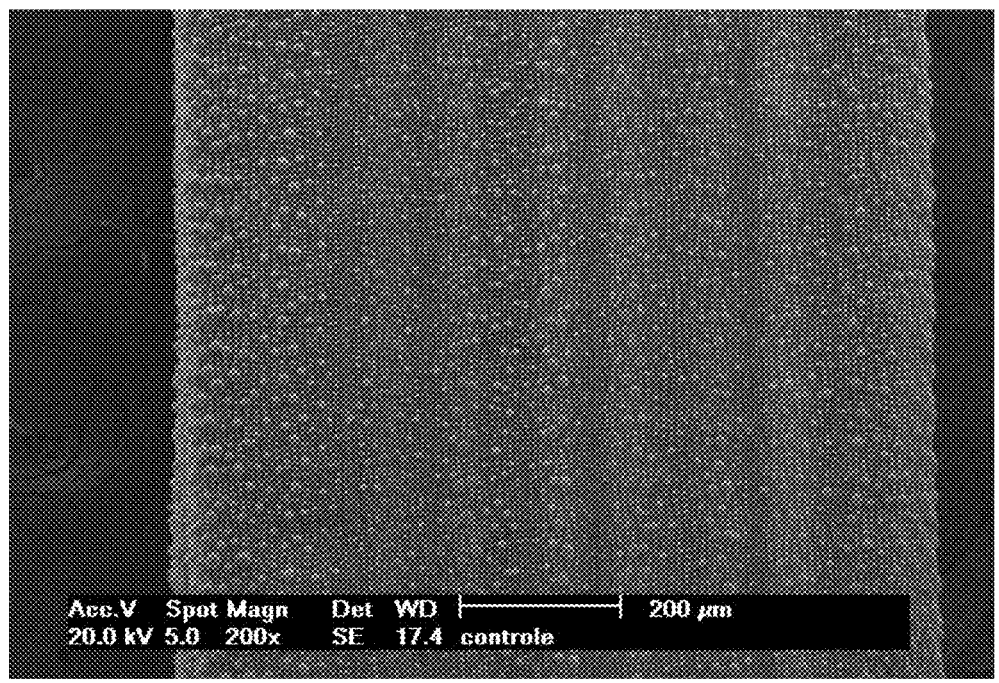
Figure 4:
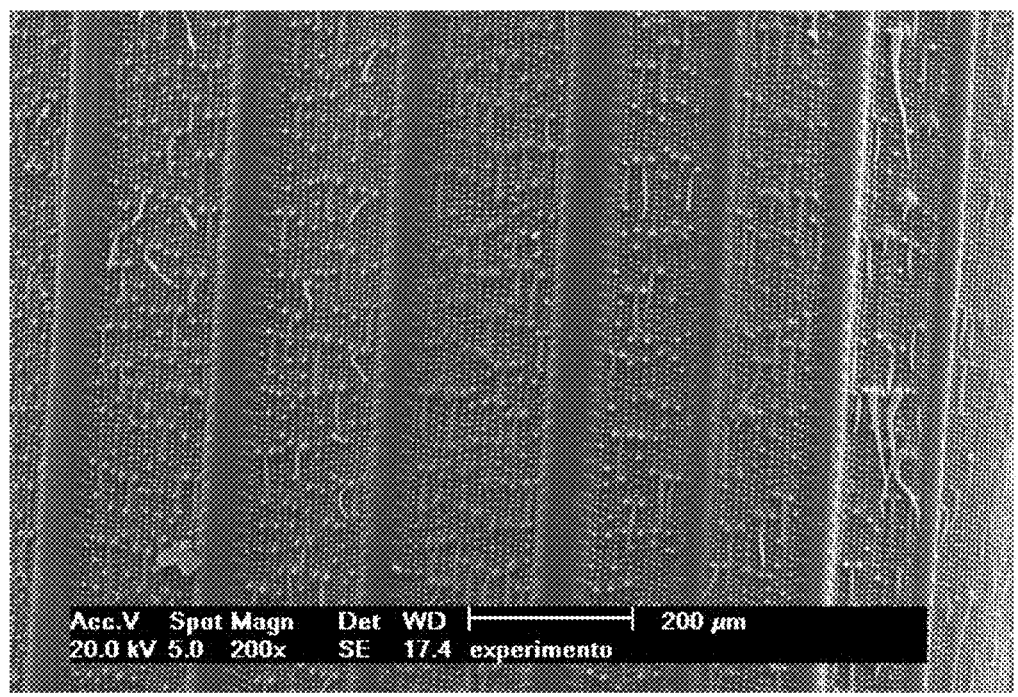

FIGS. 3 and 4 show the results of testing with rice seeds, the "control" used was a dried leaf of the species for comparison with the "test" means, this leaf was submitted to the system in the seed germination phase. An improvement was observed in the formation of the leaf structure with greater growth, demonstrating the improvement in seed quality.

Figure 5:
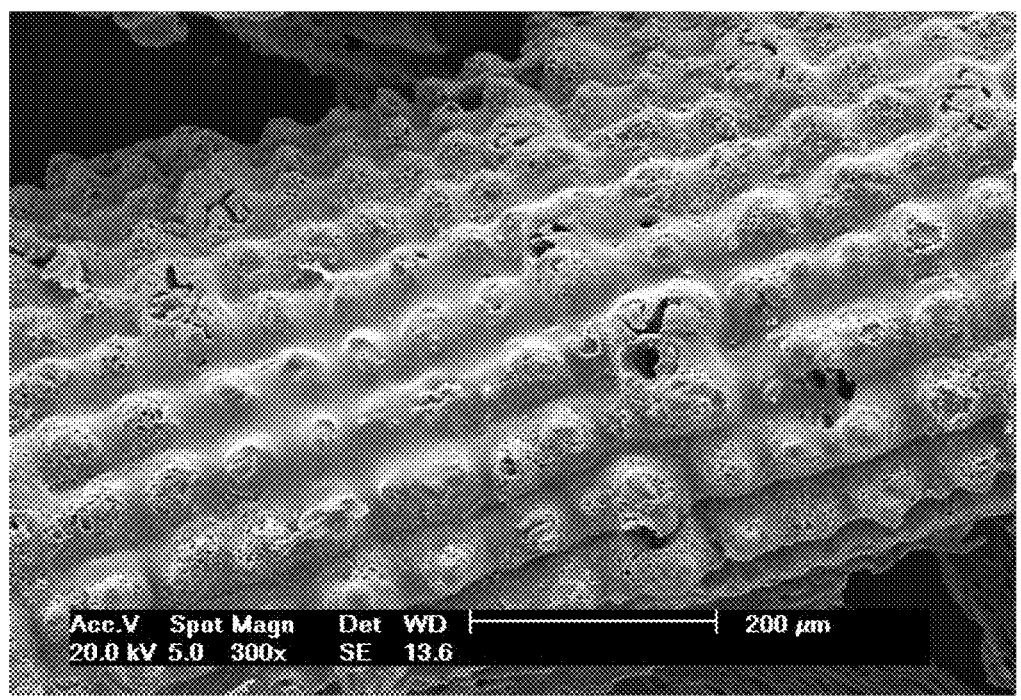
Figure 6:
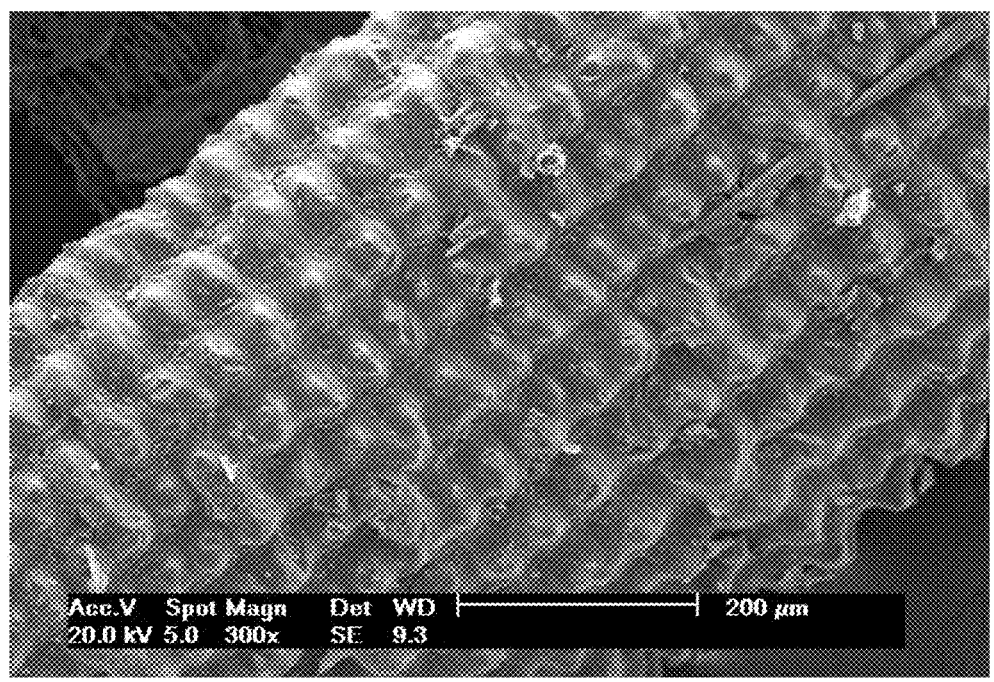

FIGS. 5 and 6 show results of the tests with a rice seed husk after burning. It is noted that the control sample, i.e., the husk not subjected to the system in comparison with the "test" husk subjected to the process, a clear uniformity in relation to micro-holes, showing seeds that were better protected from pathogens, i.e., that it may be possible for us to avoid the use of pesticides in these crops.

Figure 7:
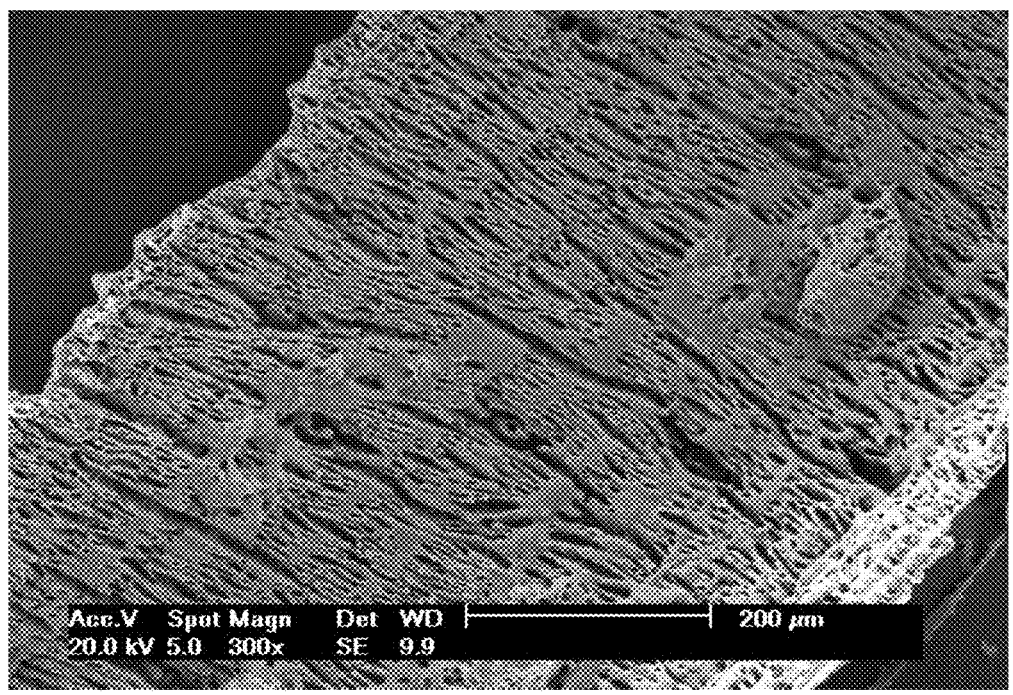

FIG. 7 shows the result of the control with rice husks.

Figure 8:
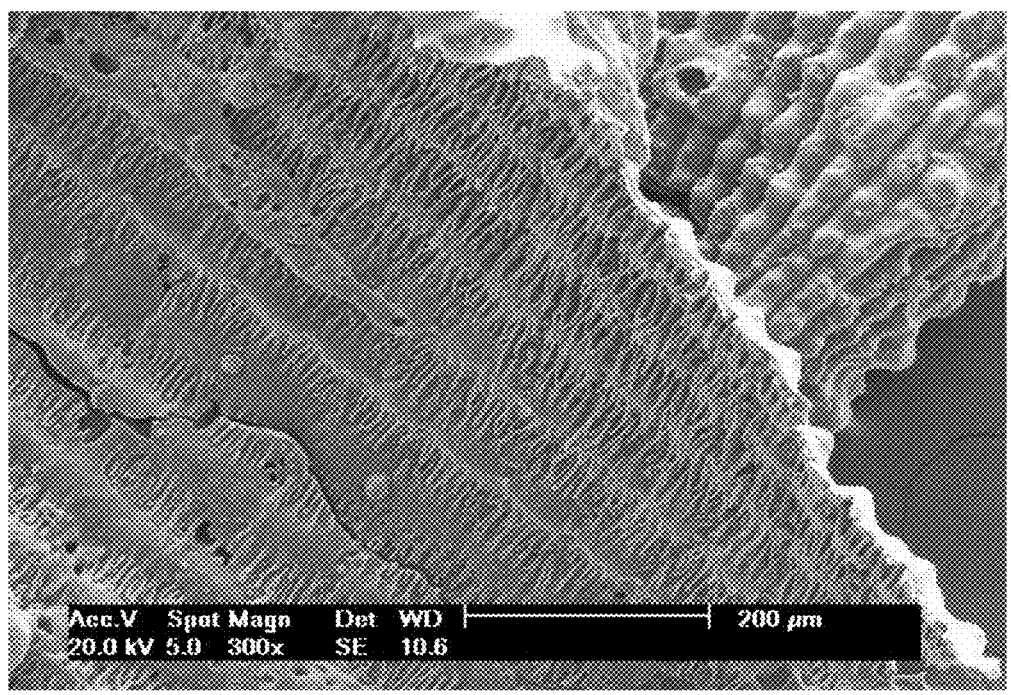

FIG. 8 shows the result of the test with rice husks in the magnetic reactor.

Figure 9:
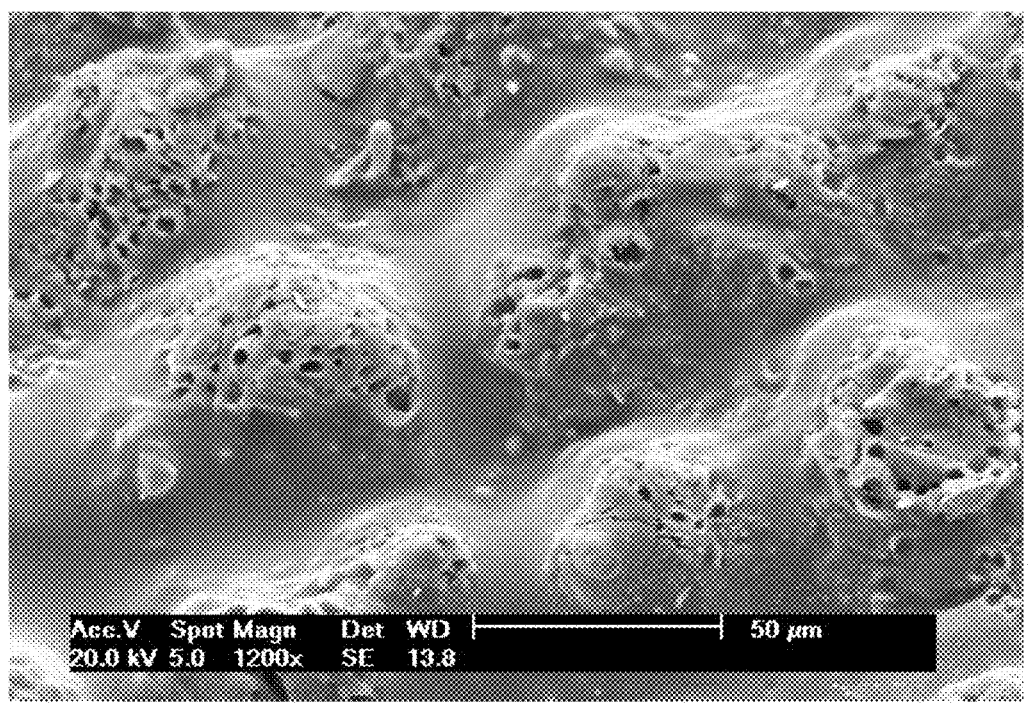

FIG. 9 shows the result of the control with rice husks.

Figure 10:
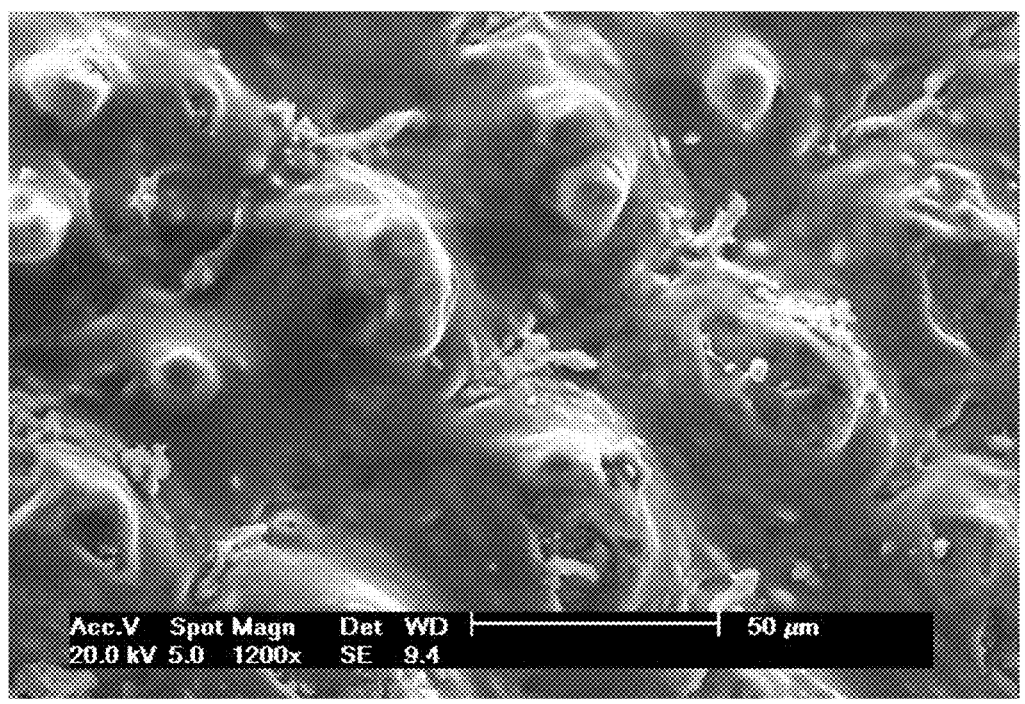

FIG. 10 shows the result of the test with rice husks in the magnetic reactor.

Figure 11:
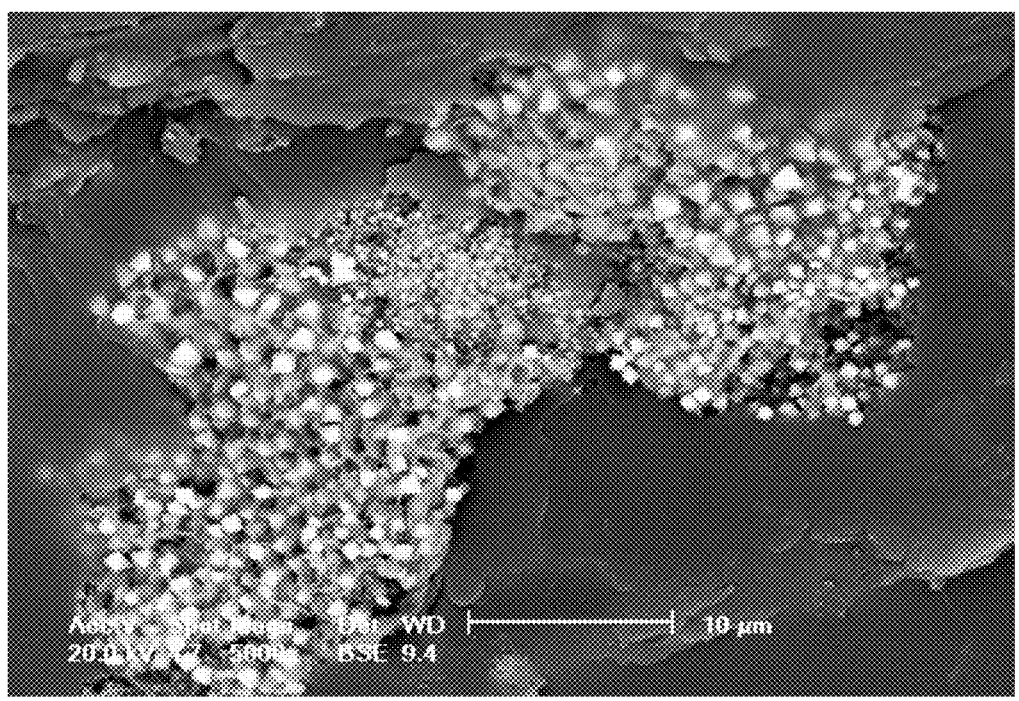
Figure 12:
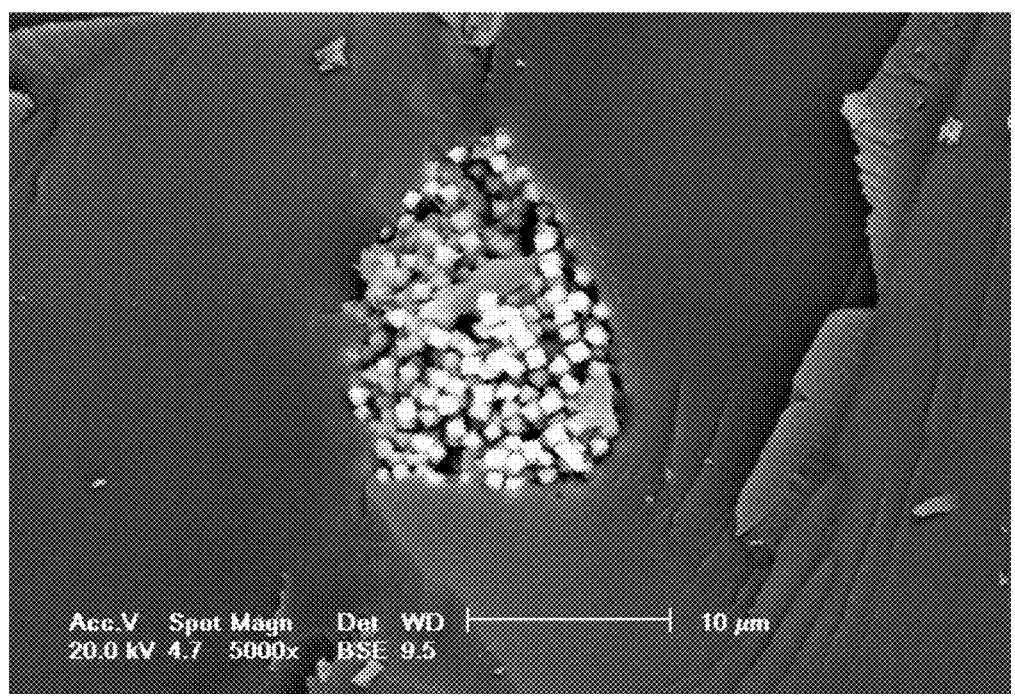

FIGS. 11 and 12 show the results obtained from a sample of coal which has been observed that the material subjected to the process presented in the separation of minerals highlighting the silicon which was practically free of impurities, showing thus a new process to purify the silicon element which may be of application in the electronics industry.

DETAILED DESCRIPTION OF PREFERRED EMBODIMENTS

The examples shown are only intended to illustrate one of many ways to carry out the invention, but without limiting the scope thereof.

In this application the terms "glass globe" and "Bio Sphere" are used interchangeably, as are the terms "magnetic reactor" and "magnetic core".

Force Modulating Apparatus

The force modulating apparatus of this invention is a minimizing and/or a blocker of non-inertial forces such as Coriolis, gravitational and centrifugal. In particular, the force modulating apparatus of this invention comprises:
a) a means for rotating, support and mounting;
b) a glass globe;
c) a means for immersion;
d) a magnetic reactor; and
e) a means for grounding.

Means for Rotating, Support and Mounting

The means for rotating, support and mounting of this invention comprises a means for support and/or for providing a means for mounting and/or rotating the Bio Sphere on the apparatus. In one preferred embodiment, the means for rotating, support and mounting of this invention comprises a turbine for longitudinal rotation, turbine for transverse rotation, mounting base for the system, telescoping tube, mounting rings, T system for mounting from the base to the axis rotor, mounting support for the liquid insufflator, mounting pins, mounting extender for magnetic cores, cone shaped funnel, silicone hose and oxygen input valve, being comprised of two rings positioned perpendicularly to each other, one of them being mobile around the Bio Sphere and the other mounted to the rim to rotate the sphere.

Bio Sphere (Glass Globe)

The Bio Sphere of this invention comprises a globe, preferably of glass, into which the material one wishes to study is placed. The main purpose of the Bio Sphere is to stabilize the material in relation to the light of the accelerations emanating from the non-inertial forces, which are minimized and/or cancelled, so as to stabilize the bodies submitted to the system. In one preferred embodiment, the Bio sphere of the invention comprises a glass globe which can be of various sizes. The submerged Bio Sphere rotating on two axes is responsible for corpuscular stabilization of the material (zero gravity).

Magnetic Reactor (Magnetic Cores)

The magnetic reactor of this invention comprises magnetic cores which stabilize the material with respect to the structure of atoms, not by modulating variations of the 3D magnetic field in the center of the Bio Sphere. In a preferred embodiment, the magnetic reactor of this invention comprises magnetic cores (rare earth) which cancel out the variations in the magnetic fields in the center of the Bio Sphere. The magnetic reactor consists of two magnetic perpendicular rings, on ring around the Bio Sphere and another magnetic ring is mounted on the ring that rotates the Bio Sphere. The reactor is responsible for stabilization of the material in its atomic structure, i.e., the atoms' spins are subjected to a uniform magnetic field.

Means for Immersion

The means for immersion of this invention comprises a liquid and/or viscous medium allowing the immersion of the apparatus comprising a means for rotation, support and mounting; a Bio Sphere and a magnetic reactor. In a preferred embodiment, the means for immersion of this invention is water, and the globe can be immersed in an aquarium, a river, or even in an ocean.

Method for Stabilizing Material

The material stabilizing method of the present invention comprises a method of stabilizing material, especially in relation to light and the structure of atoms using the magnetic Bio Sphere, comprising the stages of:
 a) insertion of the material to be stabilized into the glass globe;
 b) positioning the glass globe into the means for rotating, support and mounting;
 c) immersion of the means for rotation, support, and mounting with the glass globe in the means for immersion; and
 d) movement of the glass globe in order to block the forces.

Insertion of the Material into the Glass Globe

The material inserted into the glass globe comprises any type of material you want to test in an environment of minimized accelerations coming from non-inertial systems.

Examples of materials to be inserted include living cells and organisms such as fish and vegetables such as rice.

Positioning the Glass Globe

Positioning of the globe containing the material is essential to ensure that the magnetic field is affected by the movement of the globe. In one preferred embodiment, the glass globe within a system for support and mounting that moves the axes as defined a 3 dimensional.

Movement of the Glass Globe

The movement of the glass globe includes the movement of the turbines which start the rotation of the glass globe. In one preferred embodiment, the apparatus is totally submerged and the movement is made by the turbines which rotate at speeds controlled by the flow of water (or other liquid) under pressure. This flow of water which activates the turbines comes from a submersible pump or from an external water column (or other liquid) which is injected under pressure to turn the system into two orthogonal axes.

The method of this invention may be of application for vegetables, with rice seeds, in minerals, such as coal. It can also be of application in marine waters for the improvement of living species and even bacteria that lower the atomicity of radioactive material in the ocean.

Example 1. Preferred Embodiment

The equipment is known as Submerged Magnetic Bio Sphere. The principle is based on corpuscular mechanics and magnetic fields, for the purpose of stabilizing the material in relation to the light of accelerations emanating from the non-inertial systems (fictitious forces) being minimized, making the stabilization of the bodies subject to the system so that the magnetic fields stabilize the material through its atomic structure. In other words, there are no variations in the 3-D magnetic field in the interior central part of the glass globe of the Submerged Bio Sphere.

In FIGS. 1 and 2 we see the following components:

The first part is a mounting base for the 3 dimensional (3D) mobile system. The second part is a telescoping tube to adjust the depth of submersion of the assembly. Part 11 is a special glass globe which, depending upon the application, may be of any radius, in other words, it can have large dimensions for use in marine activities, to improve marine ecosystems. The size of the globe in the figure is 380 ml. The third part is a turbine for transverse rotation ($\omega$) with a sliding central axis in part 5 in the system. The fourth part is a ring (crown) with the function of supporting the glass globe through two sliding pivot bearings (longitudinal rotation) and also for centrally mounting the inlet funnel for the flow of liquid from turbine 6, that is responsible for the rotation ($\omega$) of the globe on the orthogonal plane. Parts 10 and 12 are rings with tapered rollers for rotating to regulate and make adjustments to the stepped pressure. Part 5 is a T shaped device for mounting from the axis rotor responsible for rotating the mobile system in the vertical plane. Part 7 is a mounting bracket for the silicone hoses with the function of injecting liquid under pressure to obtain transverse rotation of the globe in conjunction with the vertical rotation providing three dimensional movement of the globe. Part 8 is a container-shaped aquarium to submerge the system. Part 9 is a metal mesh which functions to ground the system thus preventing external electromagnetic interference, as well as static electricity fields in the environment. Parts 13, 18, and 15 are the magnetic cores (rare earth) which make up the system magnetic reactor. Part 16 is a mounting extender for magnetic cores that are mounted with iron carbon silicon plates with magnetic properties. Part 17 is a set of silicone hose and which are responsible for the movement of liquid under pressure to rotate the turbines on the orthogonal plane. Part 19 is a valve for the application of oxygen in living species.

The magnetic reactor is constituted of two mutually magnetic orthogonal fields, one around the globe in the center and the other perpendicular to it. When the system rotates on two axes, these fields rotate with the 3D system. These fields rotate together with the entire system.

The thrust of these movements is performed before the application of liquid under pressure to drive the turbines to activate the rotation of the system on the two axes. The rotational force is derived from the flow of liquid under pressure.

Those skilled in the art will appraise the knowledge presented herein and may reproduce the invention in the embodiments described and in other variants falling within the scope of the appended claims.

The invention claimed is:

1. A force modulating apparatus comprising:
 a) a glass globe;
 b) a means for rotating, supporting, and mounting the glass globe;
 c) a means for immersion of the glass globe in a fluid;

d) a magnetic reactor attached to the means for rotating, supporting, and mounting; and
e) a means for grounding surrounding: the glass globe; the means for rotating, supporting, and mounting; the means for immersion; and the magnetic reactor,
wherein the magnetic reactor is defined by two orthogonal rings, and each of the orthogonal rings comprises a magnetic core comprising rare earth metals.

2. The force modulating apparatus according to claim 1, wherein the means for rotating, supporting, and mounting the glass globe causes a rotating movement of the glass globe and wherein the rotating movement of the glass globe is configured to modulate forces selected from the group consisting of Coriolis force, gravitational force, and centrifugal force.

3. The force modulating apparatus according to claim 2, wherein the means for rotating, supporting, and mounting allows movement of the glass globe in three dimensions.

4. The force modulating apparatus according to claim 3, wherein the means for rotating, supporting, and mounting comprises a turbine for longitudinal rotation, a mounting base, a telescoping tube, mounting rings, a T system for mounting from a base to an axis rotor, a mounting support for a liquid insufflator, mounting pins, a mounting extender for magnetic cores, a cone shaped funnel, a silicone hose, and an oxygen input valve.

5. The force modulating apparatus according to claim 1, wherein the magnetic reactor is located around the glass globe and also is mounted to a rim that rotates the glass globe.

6. The force modulating apparatus according to claim 1, wherein the means for grounding comprises a copper mesh.

7. the force modulating apparatus according to claim 1, wherein the means for immersion is water.

8. The force modulating apparatus according to claim 1, wherein a material to be modulated is contained within the glass globe.

9. The force modulating apparatus according to claim 8, wherein the material to be modulated is chosen from among vegetable material, animal material, and/or mineral material.

10. The force modulating apparatus according to claim 9, wherein the vegetable material is rice seeds.

11. The force modulating apparatus according to claim 9, wherein the animal material is fish.

12. The force modulating apparatus according to claim 9, wherein the mineral material is vegetable charcoal.

13. A method for stabilizing force comprising the steps of:
a) inserting a material to be stabilized into a glass globe of a force modulating apparatus comprising:
   i) a means for rotating, supporting, and mounting;
   ii) the glass globe;
   iii) a means for immersion;
   iv) a magnetic reactor made up of rare earth metals and comprising two orthogonal rings; and
   v) a means for grounding;
b) positioning the glass globe into the means for rotating, supporting, and mounting;
c) immersing the means for rotating, supporting, and mounting with the glass globe in the means for immersion; and
d) rotating the glass globe about two orthogonal axes in order to block non-inertial forces applied to the material inserted into the glass globe.

14. The method for stabilizing forces according to claim 13, wherein the material to be stabilized is chosen from among vegetable material, animal material and/or mineral material.

15. The method for stabilizing force according to claim 14, wherein the vegetable material is rice seeds.

16. The method for stabilizing force according to claim 14, wherein the animal material is fish.

17. The method for stabilizing force according to claim 14, wherein the mineral material is vegetable charcoal.

* * * * *